United States Patent
Hara et al.

(10) Patent No.: US 10,144,424 B2
(45) Date of Patent: Dec. 4, 2018

(54) ARRANGEMENT STRUCTURE FOR VICINITY INFORMATION DETECTION SENSOR

(71) Applicant: TOYOTA JIDOSHA KABUSHIKI KAISHA, Toyota-shi, Aichi-ken (JP)

(72) Inventors: Yasuhiro Hara, Odawara (JP); Kazuki Sugie, Miyoshi (JP); Kosuke Sakakibara, Toyota (JP); Motoya Sakabe, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/041,482

(22) Filed: Feb. 11, 2016

(65) Prior Publication Data
US 2016/0297437 A1 Oct. 13, 2016

(30) Foreign Application Priority Data
Apr. 9, 2015 (JP) ................................. 2015-080004

(51) Int. Cl.
*B60R 19/48* (2006.01)
*B60K 11/08* (2006.01)
(Continued)

(52) U.S. Cl.
CPC .............. *B60W 30/16* (2013.01); *B60G 13/00* (2013.01); *B60R 11/04* (2013.01); *B60W 40/04* (2013.01);
(Continued)

(58) Field of Classification Search
CPC .............. G01S 2007/027; G01S 7/4813; G01S 2013/9385
See application file for complete search history.

(56) References Cited

U.S. PATENT DOCUMENTS 3,493,920 A * 2/1970 MacMunn .............. G01S 15/18
    342/71
3,749,197 A * 7/1973 Deutsch ............. B60K 31/0008
    180/169
(Continued)

FOREIGN PATENT DOCUMENTS

DE    2938764 A1    4/1980
DE    10316535 B3    1/2005
(Continued)

OTHER PUBLICATIONS

"Bumpers". Insurance Institute for Highway Safety, Highway Loss Data Institute. Mar. 2015. Retrieved Apr. 16, 2017 at <http://www.iihs.org/iihs/topics/t/bumpers/qanda>.*
(Continued)

*Primary Examiner* — Harshad R Patel
(74) *Attorney, Agent, or Firm* — Oliff PLC

(57) ABSTRACT

A sensor arrangement structure includes a vehicle framework member having a hollow cross-section, a vicinity information detection sensor and a cover. The vicinity information detection sensor is attached to the vehicle framework member. At least a portion of the vicinity information detection sensor is disposed inside the hollow cross-section of the vehicle framework member. A detection portion that detects vicinity information of a vehicle is oriented toward a vehicle outer side of the vehicle framework member. The cover is disposed to oppose the detection portion and allows transmission of a detection carrier that is detected by the detection portion.

8 Claims, 11 Drawing Sheets

(51) Int. Cl.
*G01S 7/02* (2006.01)
*G01S 7/481* (2006.01)
*B60W 30/16* (2012.01)
*G01S 17/93* (2006.01)
*G01S 13/93* (2006.01)
*B60G 13/00* (2006.01)
*B60W 40/04* (2006.01)
*B62D 21/17* (2006.01)
*B60R 11/04* (2006.01)
*B60R 11/00* (2006.01)

(52) U.S. Cl.
CPC ............... *B62D 21/17* (2013.01); *G01S 7/02* (2013.01); *G01S 7/4813* (2013.01); *G01S 13/931* (2013.01); *G01S 17/936* (2013.01); *B60G 2400/00* (2013.01); *B60R 2011/004* (2013.01); *G01S 2007/027* (2013.01); *G01S 2013/9364* (2013.01); *G01S 2013/9367* (2013.01); *G01S 2013/9385* (2013.01)

(56) References Cited

U.S. PATENT DOCUMENTS

| | | | |
|---|---|---|---|
| 3,794,997 A | 2/1974 | Iwatsuki et al. | |
| 3,935,922 A * | 2/1976 | Cooper | A47L 11/4011 180/168 |
| 4,063,258 A | 12/1977 | Allen | |
| 4,345,662 A * | 8/1982 | Deplante | B60T 7/18 180/168 |
| 4,346,774 A | 8/1982 | Hirota et al. | |
| 4,373,161 A * | 2/1983 | Matsumura | B60Q 1/54 180/167 |
| 4,818,099 A * | 4/1989 | Preikschat | G01S 7/4812 257/433 |
| 4,846,297 A * | 7/1989 | Field | G01S 17/936 180/169 |
| 4,993,510 A * | 2/1991 | Kato | B60R 11/0217 181/141 |
| 5,033,569 A * | 7/1991 | Hayes | B60R 19/205 180/169 |
| 5,114,060 A | 5/1992 | Boyer | |
| 5,266,955 A * | 11/1993 | Izumi | G01S 17/936 342/54 |
| 5,491,464 A | 2/1996 | Carter et al. | |
| 5,557,116 A * | 9/1996 | Masui | H01S 5/02244 257/100 |
| 5,573,299 A | 11/1996 | Masuda | |
| 5,713,586 A * | 2/1998 | Haller | A47D 13/043 180/169 |
| 5,767,793 A | 6/1998 | Agravante et al. | |
| 5,911,395 A | 6/1999 | Hussaini | |
| 5,999,865 A * | 12/1999 | Bloomquist | G05D 1/0248 299/1.05 |
| 6,020,844 A | 2/2000 | Bai et al. | |
| 6,119,067 A | 9/2000 | Kikuchi | |
| 6,157,294 A * | 12/2000 | Urai | B60Q 1/52 307/10.1 |
| 6,204,820 B1 * | 3/2001 | Jensen, Jr. | H01Q 1/005 296/180.1 |
| 6,318,774 B1 * | 11/2001 | Karr | B60R 19/483 293/102 |
| 6,496,138 B1 * | 12/2002 | Honma | G01S 13/931 342/27 |
| 6,508,325 B1 * | 1/2003 | Schwarz | B60Q 9/006 180/167 |
| 6,572,161 B2 * | 6/2003 | Wild | B60R 19/483 293/117 |
| 6,653,650 B2 | 11/2003 | McMillan et al. | |
| 6,744,399 B2 | 6/2004 | Tohyama et al. | |
| 6,765,480 B2 * | 7/2004 | Tseng | G06K 9/00805 340/425.5 |
| 6,933,837 B2 * | 8/2005 | Gunderson | B60R 21/013 180/167 |
| 6,961,023 B2 * | 11/2005 | Fujii | B29C 45/1671 343/700 MS |
| 7,023,331 B2 * | 4/2006 | Kodama | G01S 7/4008 340/435 |
| 7,102,496 B1 | 9/2006 | Ernst, Jr. et al. | |
| 7,110,324 B2 * | 9/2006 | Ho | B60R 19/483 340/435 |
| 7,365,676 B2 * | 4/2008 | Mende | G01S 13/931 342/118 |
| 7,508,353 B2 * | 3/2009 | Shingyoji | H01Q 1/3233 342/1 |
| 7,592,592 B2 * | 9/2009 | Eriksson | B60R 1/00 250/330 |
| 7,626,888 B2 | 12/2009 | Nakano et al. | |
| 7,705,771 B2 * | 4/2010 | Kato | G01S 7/35 342/175 |
| 7,733,370 B2 | 6/2010 | Werth et al. | |
| 7,852,258 B2 * | 12/2010 | Kato | G01S 7/4008 342/165 |
| 7,902,968 B2 | 3/2011 | Kojima et al. | |
| 7,988,212 B2 | 8/2011 | Hartley et al. | |
| 8,149,157 B2 * | 4/2012 | Takeuchi | G01S 7/03 342/70 |
| 8,816,932 B2 * | 8/2014 | Kawaguchi | C23C 14/0015 235/487 |
| 8,864,197 B2 * | 10/2014 | Schneider | H01Q 1/3233 293/117 |
| 9,010,844 B2 | 4/2015 | Hasegawa | |
| 9,056,586 B2 * | 6/2015 | Huttenlocher | B60R 11/02 |
| 9,081,094 B2 * | 7/2015 | Holt | G01S 13/882 |
| 9,145,286 B2 * | 9/2015 | Pfaff | B66F 9/063 |
| 9,348,014 B2 | 5/2016 | Lee et al. | |
| 9,377,529 B2 * | 6/2016 | Lieven | G01S 13/882 |
| 9,436,182 B2 * | 9/2016 | Nemec | G05D 1/0055 |
| 9,525,206 B2 * | 12/2016 | Abe | H01Q 13/02 |
| 9,527,435 B2 * | 12/2016 | Michie | B60Q 1/2611 |
| 9,533,627 B2 * | 1/2017 | Sugiura | B44C 5/0415 |
| 9,618,615 B2 * | 4/2017 | Inada | G01S 13/931 |
| 9,673,517 B2 | 6/2017 | Tran et al. | |
| 9,838,653 B2 | 12/2017 | Fish, Jr. et al. | |
| 2001/0026237 A1 | 10/2001 | Okai et al. | |
| 2002/0067305 A1 * | 6/2002 | LeBlanc | B60K 31/0008 342/198 |
| 2003/0052810 A1 * | 3/2003 | Artis | H01Q 1/3233 342/1 |
| 2003/0128164 A1 * | 7/2003 | Rahaim | H01Q 1/405 343/700 MS |
| 2003/0202097 A1 * | 10/2003 | Kallhammer | B60R 1/00 348/148 |
| 2004/0004541 A1 * | 1/2004 | Hong | B60R 1/00 340/435 |
| 2004/0183661 A1 | 9/2004 | Bowman | |
| 2004/0227663 A1 * | 11/2004 | Suzuki | G01S 7/03 342/70 |
| 2005/0140785 A1 | 6/2005 | Mazzilli | |
| 2005/0242933 A1 * | 11/2005 | Loh | B60R 19/483 340/435 |
| 2006/0162982 A1 | 7/2006 | Lich | |
| 2006/0284515 A1 * | 12/2006 | Nakajima | B60R 19/483 310/311 |
| 2007/0013200 A1 | 1/2007 | Totani et al. | |
| 2008/0277951 A1 | 11/2008 | Rathje et al. | |
| 2009/0102700 A1 | 4/2009 | Kato et al. | |
| 2010/0020306 A1 | 1/2010 | Hall | |
| 2013/0038734 A1 | 2/2013 | Furukawa | |
| 2013/0141269 A1 * | 6/2013 | Schneider | H01Q 1/3233 342/70 |
| 2013/0162028 A1 | 6/2013 | Bierley | |
| 2014/0070982 A1 * | 3/2014 | Inada | B60R 19/483 342/188 |
| 2014/0091969 A1 * | 4/2014 | Shi | G01S 13/931 342/385 |
| 2014/0111370 A1 | 4/2014 | Aleem et al. | |
| 2014/0247390 A1 | 9/2014 | Ohsumi | |
| 2014/0368375 A1 | 12/2014 | Baftiu et al. | |
| 2015/0142271 A1 * | 5/2015 | Cuddihy | B60R 19/16 701/45 |

(56) References Cited

U.S. PATENT DOCUMENTS

| | | | |
|---|---|---|---|
| 2015/0274091 A1 | 10/2015 | Lang et al. | |
| 2016/0097848 A1* | 4/2016 | Jehamy | G01S 13/08 342/120 |
| 2016/0121799 A1 | 5/2016 | McClintock et al. | |
| 2016/0236725 A1* | 8/2016 | Shirai | B62D 35/00 |
| 2016/0248152 A1* | 8/2016 | Takao | H01Q 1/44 |
| 2016/0282155 A1* | 9/2016 | Hara | G01S 17/936 |
| 2016/0291151 A1* | 10/2016 | Dechoux | B60R 19/483 |
| 2017/0297521 A1 | 10/2017 | Sugie et al. | |

FOREIGN PATENT DOCUMENTS

| | | | |
|---|---|---|---|
| EP | 1662609 A1 | 5/2006 | |
| GB | 2076610 A | 12/1981 | |
| JP | 2991659 B2 | 12/1999 | |
| JP | 2005-291808 A | 10/2005 | |
| JP | 2007-142967 A | 6/2007 | |
| JP | 2007-147319 A | 6/2007 | |
| JP | 2007-187632 A | 7/2007 | |
| JP | 2007-274686 A | 10/2007 | |
| JP | 2008-536743 A | 9/2008 | |
| JP | 2014-070899 A | 4/2014 | |
| JP | 2014-134414 A | 7/2014 | |
| WO | WO 2014068302 A1 * | 5/2014 | G01S 17/023 |

OTHER PUBLICATIONS

AG Reporter, "Google scores yet another win". Arabian Gazette. Dec. 28, 2011. Retrieved Apr. 17, 2017 at <http://www.arabiangazette.com/google-scores-win/>.*

Tokoro, Setsuo, et al. "Pre-crash sensor for pre-crash safety." The 18th International Technical Conference on the Enhanced Safety of Vehicles (ESV) Proceedings, Paper. No. 545. 2003.*

Shirakawa, Kazuo, et al. "3d-scan millimeter-wave radar for automotive application." Fujitsu Ten Tech. J. 1 (2013): 3-7.*

Apr. 24, 2017 Office Action issued in U.S. Appl. No. 15/007,930.

"Will driverless cars ever look normal?" MojoMotors.com, Oct. 9, 2014.

Feb. 28, 2018 Office Action issued in U.S. Appl. No. 15/007,930.

Travers, Jim. "Pros and Cons of Aluminum Cars and Trucks." Consumer Reports, Feb. 4, 2015, <www.consumerreports.org/cro/news/2015/02/pros-and-cons-of-aluminum-cars-and-trucks/index.htm.>, Accessed online Feb. 14, 2018.

Kaartinen et al. "Benchmarking the performance of mobile laser scanning systems using a permanent test field." Sensors 12.9 (2012): 12814-12835.

Jul. 20, 2018 Notice of Allowance issued in U.S. Appl. No. 15/007,930.

\* cited by examiner

ARRANGEMENT STRUCTURE FOR VICINITY INFORMATION DETECTION SENSOR

CROSS-REFERENCE TO RELATED APPLICATION

This application claims priority under 35 USC 119 from Japanese Patent Application No. 2015-080004 filed Apr. 9, 2015, the entire disclosure of which is incorporated by reference herein.

BACKGROUND

Technical Field

The disclosure relates to an arrangement structure for a vicinity information detection sensor.

Related Art

Japanese Patent Application Laid-Open (JP-A) No. 2005-291808 discloses a structure in which an on-board radar device (a vicinity information detection sensor) is disposed on a roof panel of a vehicle and information on the vicinity of the vehicle is detected by the on-board radar device.

SUMMARY

In a case of autonomous driving using a vicinity information detection sensor and the like, conditions in all directions must be ascertained. Accordingly, a structure is known, as in the technology described in the above-mentioned JP-A No. 2005-291808, in which a vicinity information detection sensor is disposed on a roof panel and detects vicinity information in all directions. However, when a vicinity information detection sensor is disposed on a roof panel, air resistance that acts on the vehicle during running may be increased and aerodynamic characteristics may be degraded. Furthermore, because the vicinity information detection sensor is obvious, visual appearance of the vehicle is degraded. Therefore, there is room for improvement of this technology in regard to improving the aerodynamic characteristics and appearance of a vehicle.

In consideration of the circumstances described above, one object of embodiments is to provide an arrangement structure for a vicinity information detection sensor that may improve aerodynamic characteristics and appearance.

A sensor arrangement according to a first aspect includes: a vehicle framework member having a hollow cross-section, a vicinity information detection sensor attached to the vehicle framework member, at least a portion of the vicinity information detection sensor being disposed inside the hollow cross-section of the vehicle framework member, and a detection portion of the vicinity information detection sensor that detects vicinity information of a vehicle being oriented toward a vehicle outer side of the vehicle framework member; and a cover that is disposed to oppose the detection portion and that allows transmission of a detection carrier that is detected by the detection portion.

In the sensor arrangement structure according to the first aspect, the vicinity information detection sensor is attached to the vehicle framework member that has a hollow cross-section, and at least a portion of the vehicle information detection sensor is disposed inside the hollow cross-section of the vehicle framework member. Consequently, a protrusion amount of the vehicle information detection sensor to the vehicle outer side may be made smaller than in a structure in which the vicinity information detection sensor is disposed on a roof panel, a structure in which the vicinity information detection sensor is mounted at the vehicle outer side of a vehicle framework member, or the like. As a result, air resistance acting on the vehicle during running may be reduced.

The vicinity information detection sensor according to the first aspect is provided with the detection portion that is oriented toward the vehicle outer side and detects vicinity information. The cover is disposed at a location opposing this detection portion. Consequently, there is no need to expose the vicinity information detection sensor at the vehicle outer side and the appearance of the vehicle may be improved. Further, because the cover transmits the detection carrier that the detection portion uses for detection, information on the vicinity of the vehicle may be detected, similarly to a structure in which a vicinity information detection sensor is disposed at the outer side of a vehicle. The term "detection carrier" as used herein refers to the general concept of various detection carriers and the like that can be detected by sensors, including electromagnetic waves, light and ultrasound.

A sensor arrangement structure according to a second aspect, includes the first aspect, wherein an insertion hole into which the vicinity information detection sensor extends is formed in the vehicle framework member, and the vicinity information detection sensor is mounted to a mounting bracket that is joined to a hole edge of the insertion hole and that covers a portion of the insertion hole.

In the sensor arrangement structure according to the second aspect, the vicinity information detection sensor is mounted to the mounting bracket that is joined to the hole edge of the insertion hole, and a portion of the insertion hole is covered by the mounting bracket. Therefore, even though the insertion hole is formed in the vehicle framework member, a reduction in stiffness of the vehicle framework member may be suppressed.

A sensor arrangement structure according to a third aspect, includes the first aspect, wherein an entirety of the vicinity information detection sensor is disposed inside the hollow cross-section of the vehicle framework member, an opening is provided in the vehicle framework member at a location opposing the detection portion, and the opening is closed off (covered) by the cover.

In the sensor arrangement structure according to the third aspect, because the entirety of the vicinity information detection sensor is disposed inside the vehicle framework member, aerodynamic characteristics equivalent to a vehicle that is not equipped with the vicinity information detection sensor may be obtained. Moreover, because the opening formed in the vehicle framework member is closed off by the cover, ingression of foreign matter into the vehicle framework member and the like, and a consequent degradation of detection accuracy of the vicinity information detection sensor, may be avoided.

A sensor arrangement structure according to a fourth aspect, includes the third aspect, wherein the vicinity information detection sensor is mounted to the vehicle framework member via an installation bracket that spans across an interior of the vehicle framework member.

In the sensor arrangement according to the fourth aspect, because the installation bracket spans across the interior of the vehicle framework member, the efficiency of transmission of loads that act on the vehicle framework member may be improved.

A sensor arrangement structure according to a fifth aspect, includes the first aspect, wherein a shock-absorbing member is provided between the vicinity information detection sensor and the vehicle framework member.

In the sensor arrangement structure according to the fifth aspect, when a load acts on the vehicle framework member from the exterior, a portion of this load is absorbed by the shock-absorbing member. Thus, the vicinity information detection sensor may be protected.

A sensor arrangement structure according to a sixth aspect, includes the first aspect, wherein the vicinity information detection sensor is disposed at a joining portion between a roof side rail and a center pillar of the vehicle.

In the sensor arrangement structure according to the sixth aspect, because the vicinity information detection sensor is disposed at the joining portion of the roof side rail and the center pillar, which is disposed at a vehicle upper portion, vicinity information may be detected over a wide range from the vehicle upper portion. Further, because the joining portion of the roof side rail and pillar has a higher stiffness than general portions of the roof side rail, mounting stiffness of the vicinity information detection sensor may be assured by the vicinity information detection sensor being disposed at this joining portion. Therefore, vibrations acting on the vicinity information detection sensor during running may be reduced.

A sensor arrangement structure according to a seventh aspect, includes the first aspect, wherein the vehicle framework member is formed of a material having electrical conductivity.

In the sensor arrangement structure according to the seventh aspect, because the vehicle framework member features electrical conductivity, electromagnetic waves generated inside the vehicle cabin that are directed toward the vicinity information detection sensor may be blocked by the vehicle framework member. Therefore, effects of electromagnetic noise on the vicinity information detection sensor may be suppressed.

As described hereabove, according to the sensor arrangement structure according to the first aspect, excellent effects are provided in that aerodynamic characteristics and appearance may be improved.

According to the sensor arrangement structure according to the second aspect, an excellent effect is provided in that a reduction in stiffness of the vehicle framework member may be suppressed.

According to the sensor arrangement structure according to the third aspect, an excellent effect is provided in that aerodynamic characteristics may be further improved.

According to the sensor arrangement structure according to the fourth aspect, an excellent effect is provided in that stiffness of the vehicle framework member may be raised.

According to the sensor arrangement structure according to the fifth aspect, an excellent effect is provided in that shock resistance performance of the vicinity information detection sensor may be improved.

According to the sensor arrangement structure according to the sixth aspect, excellent effects are provided in that information on the vicinity of the vehicle may be detected over a wide range while detection accuracy may be improved.

According to the sensor arrangement structure according to the seventh aspect, an excellent effect is provided in that a reduction in detection accuracy of the vicinity information detection sensor due to electromagnetic noise may be suppressed.

BRIEF DESCRIPTION OF THE DRAWINGS

Example embodiments will be described in detail based on the following figures, wherein.

DETAILED DESCRIPTION

First Exemplary Embodiment

Figure 1:
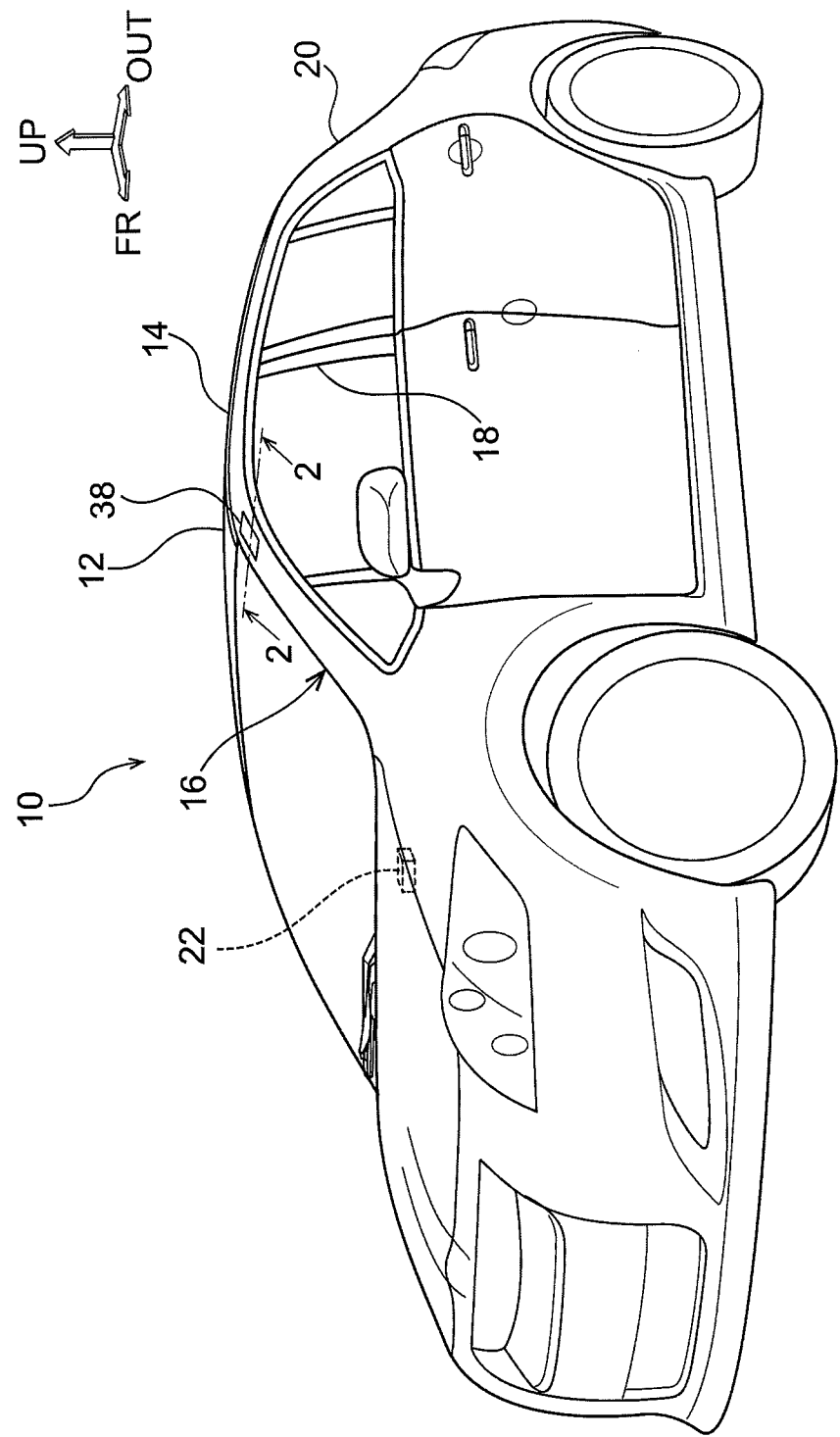
FIG. 1 is a perspective view showing a vehicle in which an arrangement structure for a vicinity information detection sensor in accordance with a first exemplary embodiment is employed.

Herebelow, an autonomous driving vehicle in which an arrangement structure for a vicinity information detection sensor in accordance with a first exemplary embodiment is employed is described with reference to FIG. 1 to FIG. 3. The arrow FR that is shown as appropriate in the drawings indicates the vehicle forward side of the autonomous driving vehicle in which the vicinity information detection sensor is mounted, the arrow UP indicates the vehicle upper side, and the arrow OUT indicates a vehicle width direction outer side. In the following descriptions, where the directions front, rear, up, down, left and right are used without being particularly specified, the same represent the front and rear in the vehicle front-and-rear direction, up and down in the vehicle up-and-down direction, and left and right if facing in the running direction of the vehicle.

As shown in FIG. 1, a roof panel 12 is disposed at a vehicle upper portion of an autonomous driving vehicle 10 (hereinafter referred to simply as "the vehicle 10"). A pair of left and right roof side rails 14 are disposed at the two vehicle width direction sides of the roof panel 12.

Each roof side rail 14 extends in the vehicle front-and-rear direction. A front header and a rear header, which are not shown in the drawings, span across in the vehicle width direction between the pair of roof side rails 14. The front header spans between front end portions of the roof side rails 14 and the rear header spans between rear end portions of the roof side rails 14.

A front pillar 16 extends to the vehicle lower side from the front end portion of each roof side rail 14. The front pillar 16 serves as a vehicle framework member. A center pillar 18 extends to the vehicle lower side from the roof side rail 14 at the vehicle rear relative to the front pillar 16. A rear pillar 20 extends to the vehicle lower side from the roof side rail 14 at the vehicle rear relative to the center pillar 18. The front pillar 16, the center pillar 18 and the rear pillar 20 are each provided as pairs at left and right. In the present exemplary embodiment, a transmissive member 38 that serves as a cover is provided at an upper portion of each front pillar 16. A vicinity information detection sensor 34 is disposed at the vehicle inner side of the transmissive member 38 (see FIG. 2).

A controller 22 that serves as a control unit is provided in the vehicle 10. The controller 22 controls running of the vehicle 10 in accordance with vicinity information detected by each vicinity information detection sensor 34 and the like. Controller 22 can be a micro-computer having a central processing unit (CPU), ROM and RAM, for example. The vicinity information detection sensor 34 is electronically connected to the controller 22. The controller 22 is also electronically connected to an electronic power steering (EPS) control unit, a brake electronic control unit (ECU) and so forth. The controller 22 is configured to be capable of controlling running of the vehicle 10 without a driver driving the vehicle 10. In the present exemplary embodiment, the controller 22 is configured to be switchable between an automatic driving mode, in which the controller 22 controls running of the vehicle 10 in accordance with vicinity information detected by the vicinity information detection sensor 34, and a manual driving mode, in which a driver personally operates a steering wheel, which is not shown in the drawings, and causes running of the vehicle 10. A location at which the controller 22 is installed is not limited by the present exemplary embodiment but may be suitably modified in accordance with positions of the vicinity information detection sensor 34. The above-mentioned driving modes are also not limiting. A structure is possible that supports driving in accordance with vicinity information detected by the vicinity information detection sensor 34 and the like (high-level driving support).

—Arrangement Structure for the Vicinity Information Detection Sensor—

Figure 2:
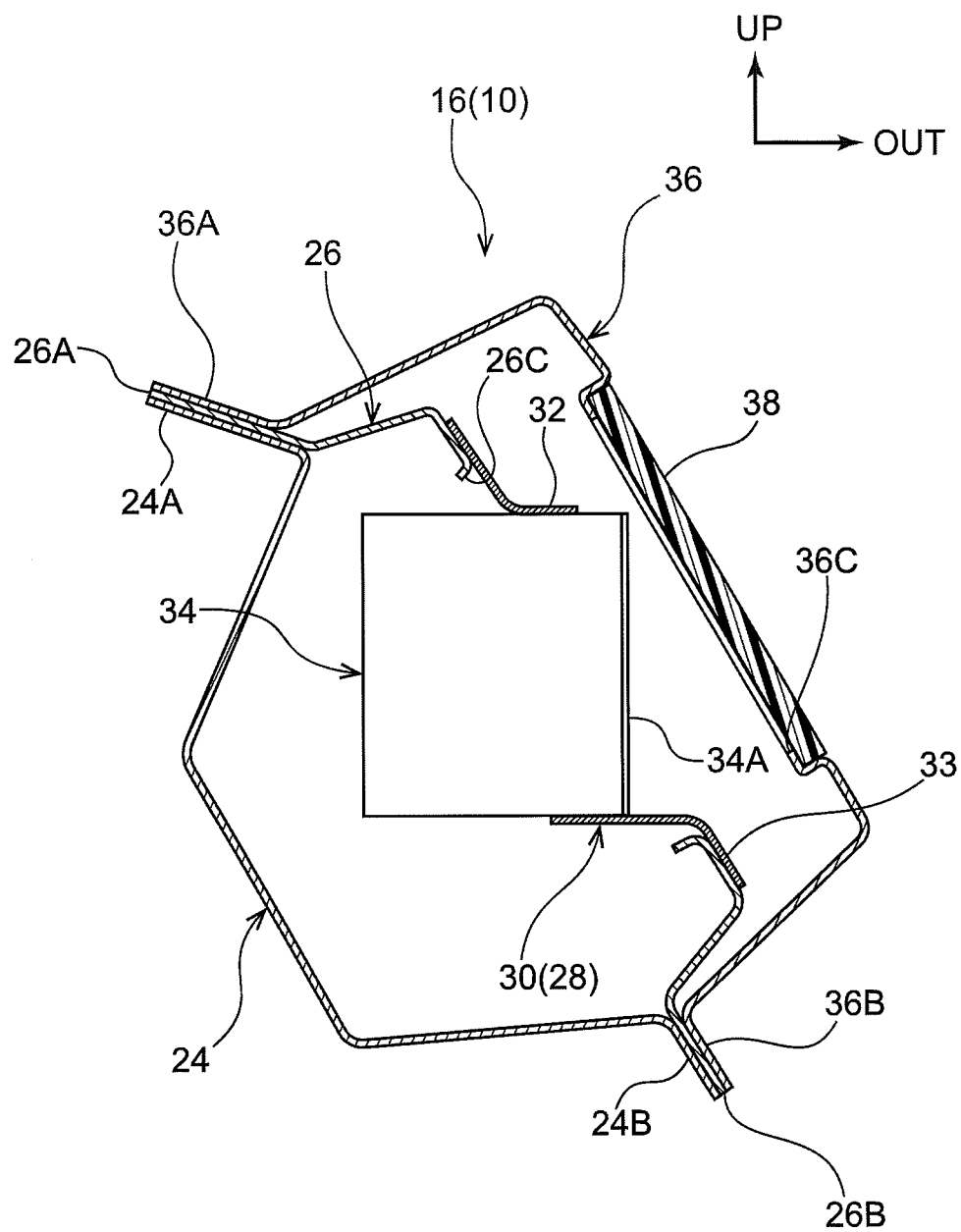
FIG. 2 is a sectional diagram showing a section cut along line 2-2 of FIG. 1 in a magnified state.

As illustrated in FIG. 2, the front pillar 16 is formed as a closed cross section structure (a hollow enclosed chamber) that includes a front pillar inner panel 24 and a front pillar outer panel 26.

The front pillar inner panel 24 is disposed at the vehicle inner side and extends in the vehicle up-and-down direction, and is formed of a member with electrical conductivity. A cross section of the front pillar inner panel 24 cut vertically along the vehicle width direction is formed substantially in a hat shape that is open to the vehicle upper side and the vehicle width direction outer side. An inner side inner flange 24A protrudes to the vehicle width direction inner side and the vehicle upper side from a vehicle width direction inner side end portion of the front pillar inner panel 24. An inner side outer flange 24B protrudes to the vehicle width direction outer side and the vehicle lower side from a vehicle width direction outer side end portion of the front pillar inner panel 24.

The front pillar outer panel 26 is disposed at the vehicle outer side relative to the front pillar inner panel 24. The front pillar outer panel 26 extends in the vehicle up-and-down direction and is formed of a member that features electrical conductivity. A cross section of the front pillar outer panel 26 cut vertically along the vehicle width direction is formed substantially in a hat shape that is open to the vehicle lower side and the vehicle width direction inner side. An outer side inner flange 26A protrudes along the inner side inner flange 24A from a vehicle width direction inner side end portion of the front pillar outer panel 26. The outer side inner flange 26A and the inner side inner flange 24A are joined together by welding or the like.

An outer side outer flange 26B protrudes along the inner side outer flange 24B from a vehicle width direction outer side end portion of the front pillar outer panel 26. The outer side outer flange 26B and the inner side outer flange 24B are joined together by welding or the like.

An insertion hole 26C is formed in the front pillar outer panel 26. A mounting bracket 28 is joined to a hole edge of the insertion hole 26C. A portion of the insertion hole 26C is covered by the mounting bracket 28. The vicinity information detection sensor 34 is mounted to the front pillar outer panel 26 via the mounting bracket 28.

Figure 3:
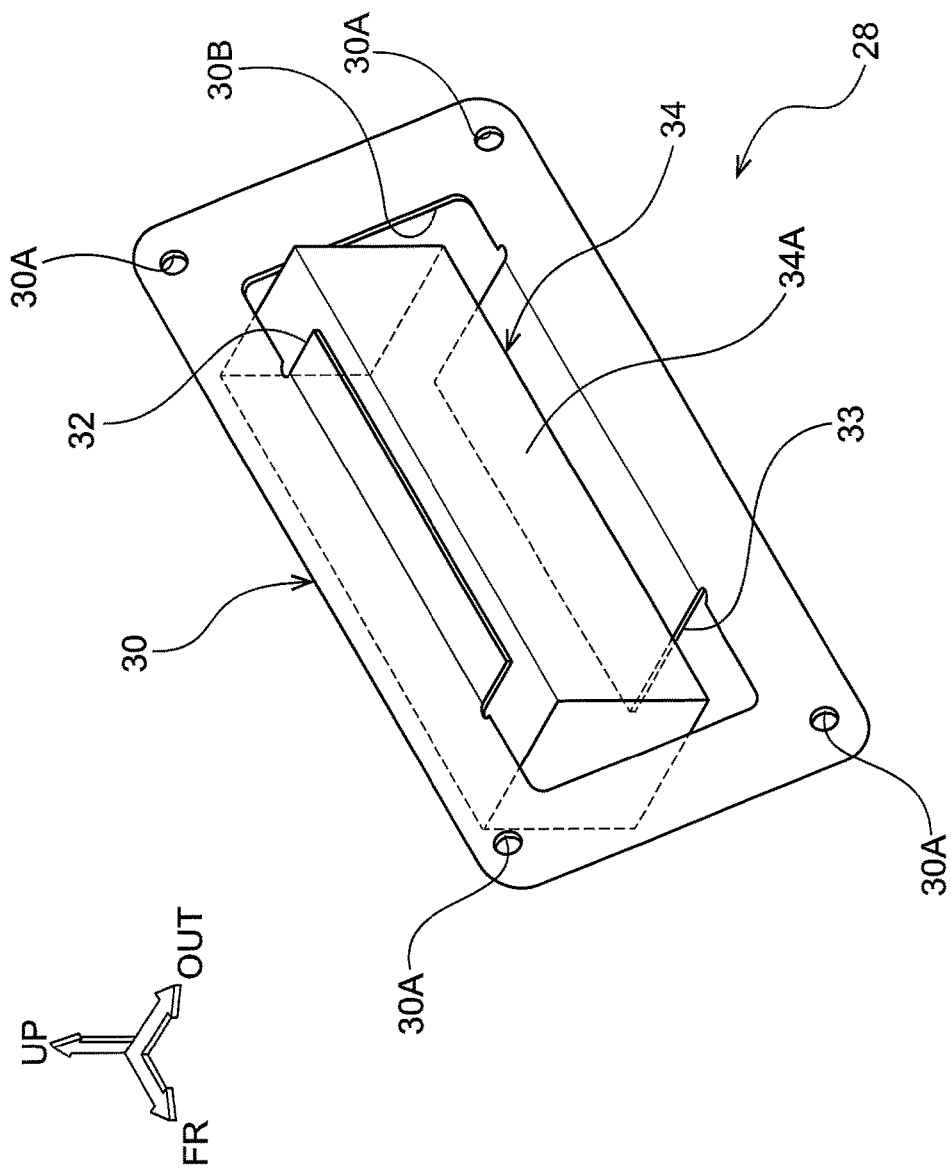
FIG. 3 is a perspective diagram showing a bracket for mounting the vicinity information detection sensor in accordance with the first exemplary embodiment.

As shown in FIG. 3, the mounting bracket 28 is provided with a bracket main body portion 30 that is formed in a substantially rectangular shape. Bolt holes 30A are formed at each of the four corners of the bracket main body portion 30. The mounting bracket 28 is fastened (joined) to the hole edge of the insertion hole 26C of the front pillar outer panel 26 by fasteners such as bolts or the like, which are not shown in the drawings, being inserted into the bolt holes 30A.

A substantially rectangular sensor mounting hole 30B is formed at a central region of the bracket main body portion 30. An upper support piece 32 is projected to the vehicle width direction outer side from an upper edge of the sensor mounting hole 30B, and a lower support piece 33 is projected to the vehicle width direction inner side from a lower edge of the sensor mounting hole 30B. The vicinity information detection sensor 34 is inserted into the sensor mounting hole 30B, and is fitted in between the upper support piece 32 and the lower support piece 33 and supported from above and below by the same.

As shown in FIG. 2, a portion of the vicinity information detection sensor 34 is inserted inside the front pillar 16 through the insertion hole 26C of the front pillar outer panel 26. The vicinity information detection sensor 34 is provided with a detection portion 34A. The detection portion 34A is oriented to the vehicle outer side of the vicinity information detection sensor 34 and is configured such that vicinity information of the vehicle 10 may be detected by the detection portion 34A. In the present exemplary embodiment, as an example, a millimeter wave radar is employed as the vicinity information detection sensor 34 and an electromagnetic wave transmission unit and reception unit constitute the detection portion 34A, but this is not limiting. For example, a laser radar, an ultrasound sensor, an optical camera or the like may be employed, and alternative sensors may be employed. If a laser radar is employed as the vicinity information detection sensor 34, a laser light emission unit and laser light detection unit constitute the detection portion. If an ultrasound sensor is employed as the vicinity information detection sensor 34, an acoustic transmitter and an acoustic receiver constitute the detection portion. If an optical camera is employed as the vicinity information detection sensor 34, a visible light detection unit constitutes the detection portion.

The transmissive member 38 is disposed at the vehicle outer side relative to the vicinity information detection sensor 34. The transmissive member 38 is mounted at a side outer panel (a side member outer) 36.

A cross section of the side outer panel 36 cut vertically along the vehicle width direction is formed substantially in a hat shape that is open to the vehicle lower side and the vehicle width direction inner side. An inner flange 36A protrudes along the outer side inner flange 26A from a vehicle width direction inner side end portion of the side outer panel 36. The inner flange 36A is joined to both the inner side inner flange 24A and the outer side inner flange 26A by welding or the like.

An outer flange 36B protrudes along the outer side outer flange 26B from a vehicle width direction outer side end portion of the side outer panel 36. The outer flange 36B is joined to both the inner side outer flange 24B and the outer side outer flange 26B by welding or the like.

A cover mounting hole 36C is formed at a location of the side outer panel 36 that opposes the detection portion 34A of the vicinity information detection sensor 34 in the vehicle width direction. The transmissive member 38 is mounted at the cover mounting hole 36C. Thus, the transmissive member 38 is disposed at a location opposing the detection portion 34A in the vehicle width direction.

The transmissive member 38 is formed of a material that allows transmission of a detection carrier that the detection portion 34A of the vicinity information detection sensor 34 detects. The transmissive member 38 according to the present exemplary embodiment is formed of a non-transparent resin material that transmits electromagnetic waves. In the present exemplary embodiment, the transmissive member 38 is the same color as the side outer panel 36. Alternatively, if a laser radar, an optical camera or the like is employed as the vicinity information detection sensor 34, the transmissive member 38 may be formed of a transparent resin material that transmits laser light, visible light or the like. Further, if an ultrasound sensor is employed as the vicinity information detection sensor 34, the transmissive member 38 may be formed of a material that transmits ultrasound waves.

—Operation and Effects—

Now, operation and effects of the vehicle 10 in which the arrangement structure for the vicinity information detection sensor 34 according to the present exemplary embodiment is employed are described. In the present exemplary embodiment, the vehicle 10 is caused to run in accordance with vicinity information detected by the vicinity information detection sensor 34 mounted at the front pillar 16 and the like. More specifically, information on the vicinity of the vehicle 10 is detected by the detection portion 34A of the vicinity information detection sensor 34 and this vicinity information is sent to the controller 22 via a wire harness, which is not shown in the drawings. Hence, by signals being sent from the controller 22 to the EPS control unit, the brake ECU and the like, running of the vehicle 10 is controlled in accordance with the vicinity information acquired from the vicinity information detection sensor 34 and the like.

In this case, the vicinity information detection sensor 34 is mounted at the front pillar 16 with the closed cross section structure constituted by the front pillar inner panel 24 and the front pillar outer panel 26, and a portion of the vicinity information detection sensor 34 is disposed inside the front pillar 16. Thus, because at least a portion of the vicinity information detection sensor 34 is disposed at the inside, a protrusion amount of the vicinity information detection sensor 34 to the vehicle outer side may be decreased. As a result, air resistance acting on the vehicle 10 during running may be reduced compared to a structure in which the vicinity information detection sensor 34 is disposed on a roof panel, a structure in which the vicinity information detection sensor 34 is mounted at the vehicle outer side of a vehicle framework member, or the like.

In the present exemplary embodiment, the transmissive member 38 is disposed at a location opposing the detection portion 34A of the vicinity information detection sensor 34, and the vicinity information detection sensor 34 is covered from the vehicle outer side thereof by the transmissive member 38. Therefore, there is no need to expose the vicinity information detection sensor 34 at the vehicle outer side and the appearance of the vehicle 10 may be improved compared to a structure in which the vicinity information detection sensor 34 is exposed.

Further, because the transmissive member 38 transmits the detection carrier that the detection portion 34A uses for detection (i.e., electromagnetic waves in the present exemplary embodiment), vicinity information of the vehicle 10 may be detected, similarly to a structure in which the vicinity information detection sensor 34 is disposed at the outer side of a vehicle.

In the present exemplary embodiment, the transmissive member 38 is formed of a non-transparent resin material and is made to be the same color as the side outer panel 36. Therefore, the transmissive member 38 is not obvious and the visual design of the vehicle 10 may be improved.

In the present exemplary embodiment, the mounting bracket 28 is joined to the hole edge of the insertion hole 26C formed in the front pillar outer panel 26 and a portion of the insertion hole 26C is covered by the mounting bracket 28. Therefore, even though the insertion hole 26C for inserting the vicinity information detection sensor 34 is formed in the front pillar outer panel 26, a reduction in stiffness of the front pillar outer panel 26 (and the front pillar 16) may be suppressed. Moreover, a vicinity information detection sensor with a different shape may be mounted simply by altering the shape, size and the like of the mounting bracket 28.

In the present exemplary embodiment, because the front pillar 16 is constituted of a material with electrical conductivity, effects of electromagnetic noise generated inside a vehicle cabin on the vicinity information detection sensor 34 may be suppressed. In specific terms, the vicinity information detection sensor 34 might be affected by electromagnetic waves (electromagnetic noise) generated from audio equipment, switches and the like inside the vehicle cabin. In the present exemplary embodiment, electromagnetic waves generated from inside the vehicle cabin that are directed toward the vicinity information detection sensor 34 are blocked by the front pillar 16. Therefore, the effects of electromagnetic noise from inside the vehicle cabin on the vicinity information detection sensor 34 may be suppressed. That is, electromagnetic noise generated from inside the vehicle cabin is blocked by the front pillar 16 while the detection carrier that the vicinity information detection sensor 34 detects passes through the transmissive member 38. Thus, the detection accuracy of the vicinity information detection sensor 34 may be excellently maintained.

Second Exemplary Embodiment

Now, an autonomous driving vehicle in which an arrangement structure for a vicinity information detection sensor in accordance with a second exemplary embodiment is employed is described with reference to FIG. 4 and FIG. 5.

Structures that are the same as in the first exemplary embodiment are assigned the same reference numerals and are not described here.

Figure 4:
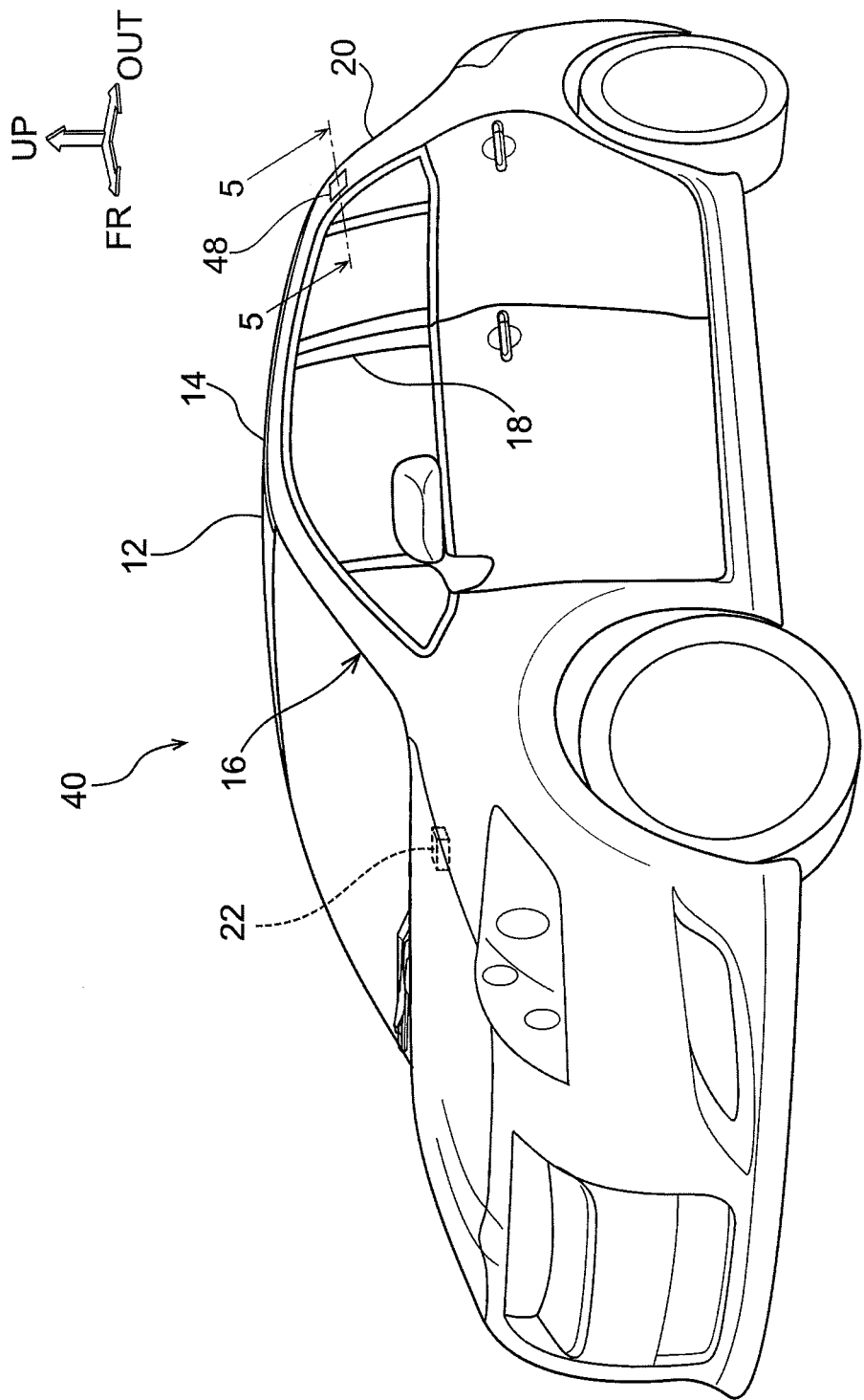
FIG. 4 is a perspective view showing a vehicle in which an arrangement structure for a vicinity information detection sensor in accordance with a second exemplary embodiment is employed.
Figure 5:
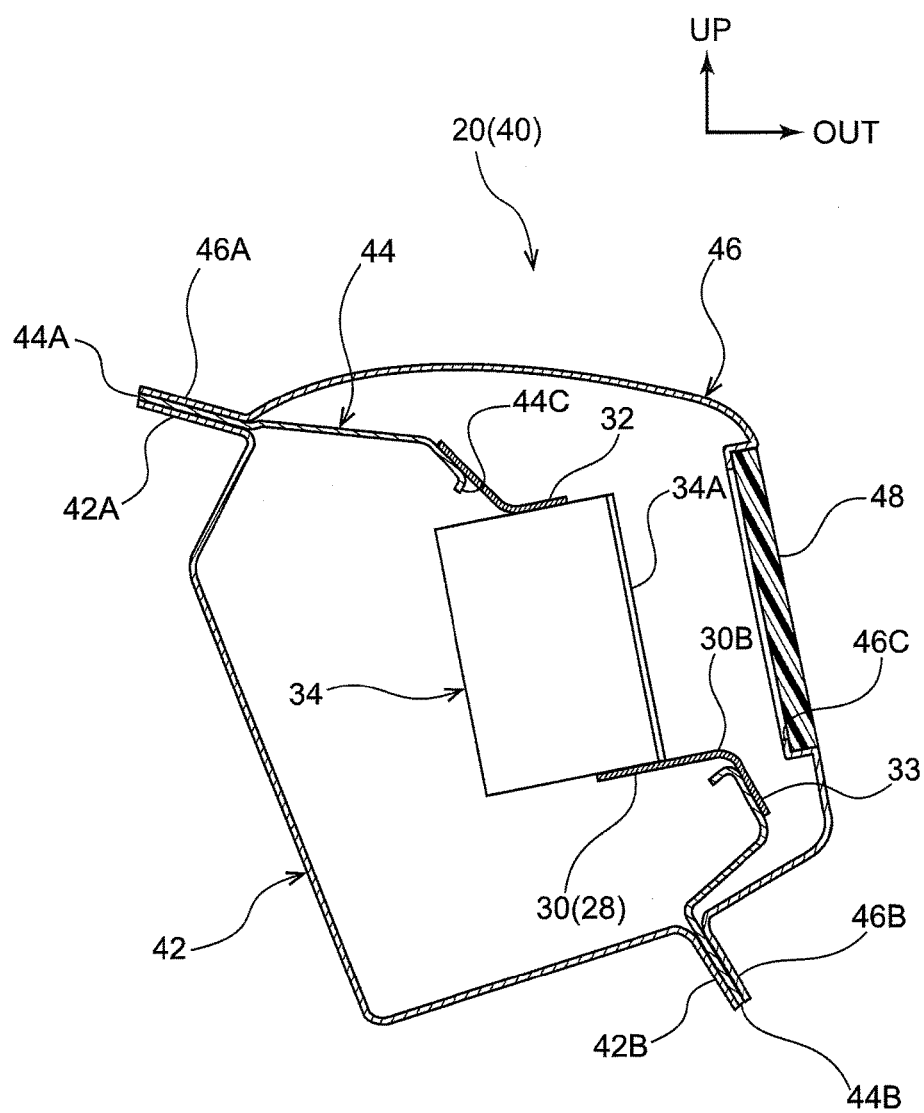
FIG. 5 is a sectional diagram showing a section cut along line 5-5 of FIG. 4 in a magnified state.

As shown in FIG. 4, in the present exemplary embodiment, a transmissive member 48 that serves as the cover is disposed at an upper portion of the rear pillar 20, which serves as a vehicle framework member structuring an autonomous driving vehicle 40 (hereinafter referred to simply as "the vehicle 40"). As shown in FIG. 5, the vicinity information detection sensor 34 is disposed at the vehicle inner side of the transmissive member 48.

The rear pillar 20 is formed as a closed cross section structure (it defines a hollow chamber) that includes a rear pillar inner panel 42 and a rear pillar outer panel 44. The rear pillar inner panel 42 is disposed at the vehicle inner side and is formed of a member that features electrical conductivity. An inner side inner flange 42A protrudes to the vehicle width direction inner side and the vehicle upper side from a vehicle width direction inner side end portion of the rear pillar inner panel 42. An inner side outer flange 42B protrudes to the vehicle width direction outer side and the vehicle lower side from a vehicle width direction outer side end portion of the rear pillar inner panel 42.

The rear pillar outer panel 44 is disposed at the vehicle outer side relative to the rear pillar inner panel 42 and is formed of a member that features electrical conductivity. An outer side inner flange 44A protrudes along the inner side inner flange 42A from a vehicle width direction inner side end portion of the rear pillar outer panel 44. The outer side inner flange 44A and the inner side inner flange 42A are joined together by welding or the like.

An outer side outer flange 44B protrudes along the inner side outer flange 42B from a vehicle width direction outer side end portion of the rear pillar outer panel 44. The outer side outer flange 44B and the inner side outer flange 42B are joined together by welding or the like.

An insertion hole 44C is formed in the rear pillar outer panel 44. The mounting bracket 28 is joined to a hole edge of the insertion hole 44C. The vicinity information detection sensor 34 is mounted to the rear pillar outer panel 44 via the mounting bracket 28. Specifically, the vicinity information detection sensor 34 is inserted into the sensor mounting hole 30B of the bracket main body portion 30, and is fitted in between the upper support piece 32 and the lower support piece 33 and supported by the same.

The transmissive member 48 is disposed at the vehicle outer side relative to the vicinity information detection sensor 34. The transmissive member 48 is mounted at a side outer panel (a side member outer) 46.

A cross section of the side outer panel 46 cut vertically along the vehicle width direction is formed substantially in a hat shape that is open to the vehicle lower side and the vehicle width direction inner side. An inner flange 46A protrudes along the outer side inner flange 44A from a vehicle width direction inner side end portion of the side outer panel 46. The inner flange 46A is joined to both the inner side inner flange 42A and the outer side inner flange 44A by welding or the like.

An outer flange 46B protrudes along the outer side outer flange 44B from a vehicle width direction outer side end portion of the side outer panel 46. The outer flange 46B is joined to both the inner side outer flange 42B and the outer side outer flange 44B by welding or the like.

A cover mounting hole 46C is formed at a location of the side outer panel 46 that opposes the detection portion 34A of the vicinity information detection sensor 34 in the vehicle width direction. The transmissive member 48 is mounted at the cover mounting hole 46C. Thus, the transmissive member 48 is disposed at a location opposing the detection portion 34A in the vehicle width direction.

—Operation and Effects—

Now, operation and effects of the vehicle 40 in which the arrangement structure for the vicinity information detection sensor 34 according to the present exemplary embodiment is employed are described. In the present exemplary embodiment, a portion of the vicinity information detection sensor 34 is disposed inside the rear pillar 20. Thus, a protrusion amount of the vicinity information detection sensor 34 to the vehicle outer side may be decreased.

In the present exemplary embodiment, because the vicinity information detection sensor 34 is disposed at the rear pillar 20, vicinity information to the vehicle rear side in particular may be effectively detected. Other operations are the same as in the first exemplary embodiment.

Third Exemplary Embodiment

Now, an autonomous driving vehicle in which an arrangement structure for a vicinity information detection sensor in accordance with a third exemplary embodiment is employed is described with reference to FIG. 6. Structures that are the same as in the first exemplary embodiment are assigned the same reference numerals and are not described here.

Figure 6:
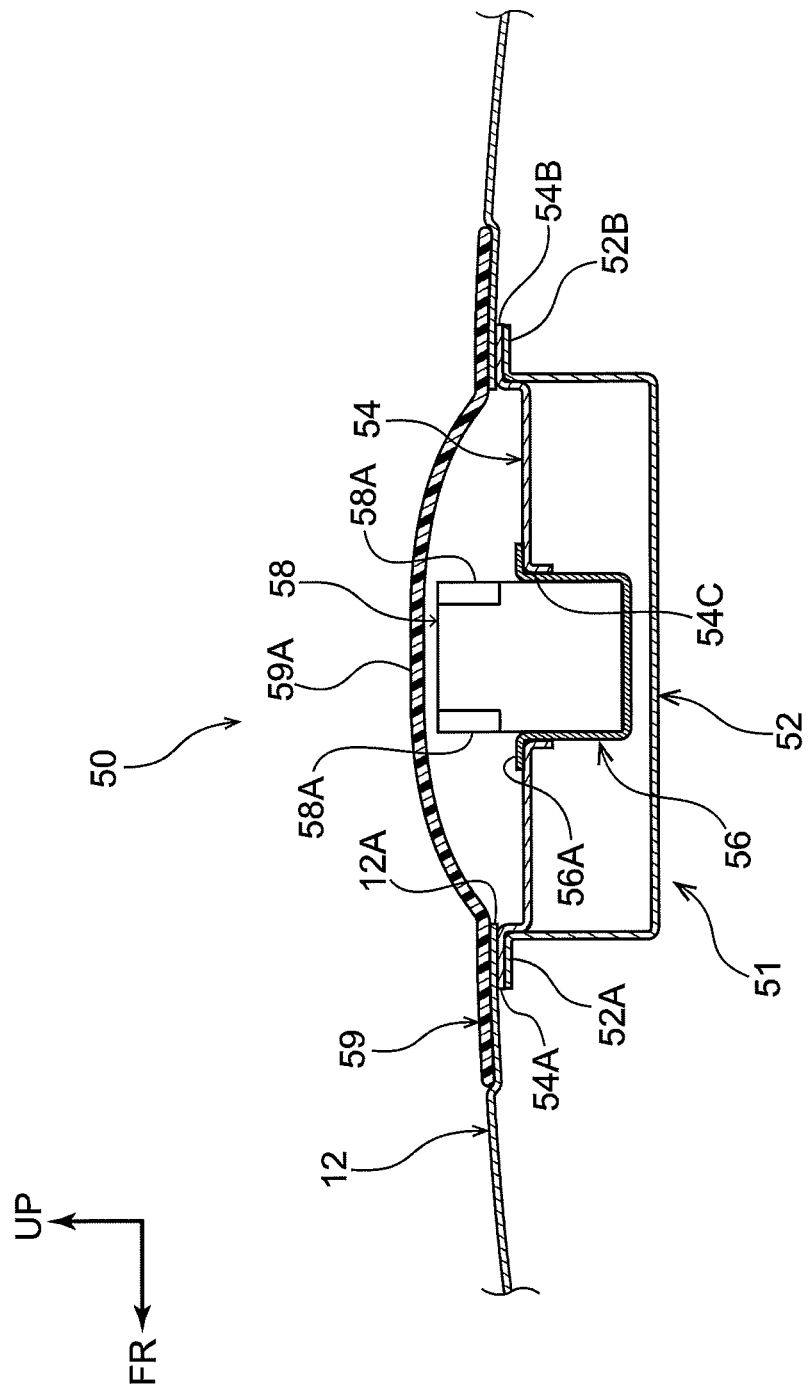
FIG. 6 is a sectional diagram of a vehicle upper portion of a vehicle in which an arrangement structure for a vicinity information detection sensor in accordance with a third exemplary embodiment is employed.

As shown in FIG. 6, in the present exemplary embodiment, a roof reinforcement 51 that serves as a vehicle framework member is arranged in the vehicle width direction along the roof panel 12, which structures an autonomous driving vehicle 50 (hereinafter referred to simply as "the vehicle 50"). A vicinity information detection sensor 58 is mounted at this roof reinforcement 51.

The roof reinforcement 51 includes a roof lower panel 52 and a roof upper panel 54 and is formed with a closed cross section structure (they define a hollow chamber). The roof reinforcement 51 is formed of members that feature electrical conductivity.

The roof lower panel 52 is disposed at the vehicle inner side and a cross section thereof cut vertically along the vehicle front-and-rear direction is formed substantially in a hat shape that is open to the vehicle upper side. A lower side front flange 52A protrudes to the vehicle forward side from a front end portion of the roof lower panel 52. A lower side rear flange 52B protrudes to the vehicle rearward side from a rear end portion of the roof lower panel 52.

The roof upper panel 54 is disposed at the vehicle outer side relative to the roof lower panel 52. A cross section of the roof upper panel 54 cut vertically along the vehicle front-and-rear direction is formed substantially in a flat hat shape that is open to the vehicle upper side. An upper side front flange 54A protrudes along the lower side front flange 52A from a front end portion of the roof upper panel 54. The upper side front flange 54A and the lower side front flange 52A are joined together by welding or the like, and the upper side front flange 54A is joined to a lower face of the roof panel 12.

An upper side rear flange 54B protrudes along the lower side rear flange 52B from a rear end portion of the roof upper panel 54. The upper side rear flange 54B and the lower side rear flange 52B are joined together by welding or the like, and the upper side rear flange 54B is joined to the lower face of the roof panel 12.

An insertion hole 54C is formed, in a substantially circular shape in plan view, in a central region of the roof upper panel 54. The vicinity information detection sensor 58 is mounted at the insertion hole 54C via a bracket 56.

The bracket 56 is formed in the shape of a circular tube with a bottom and is open in the vehicle upper direction. The bracket 56 is inserted inside the roof reinforcement 51. An upper flange 56A protrudes to the outer periphery side from an upper end portion of the bracket 56. The upper flange 56A is joined to a hole edge of the insertion hole 54C.

The vicinity information detection sensor 58 is disposed at the inner periphery side of the bracket 56. The vicinity information detection sensor 58 according to the present exemplary embodiment is formed substantially in a circular rod shape. A lower portion of the vicinity information detection sensor 58 is tightly fitted into the bracket 56.

Plural detection portions 58A are provided at an upper portion of the vicinity information detection sensor 58, spaced apart at an outer periphery face thereof. (Only two of the detection portions 58A are shown in FIG. 6.) Each detection portion 58A is oriented to the vehicle outer side and is configured such that vicinity information of the vehicle 50 may be detected by the detection portion 58A. In the present exemplary embodiment, as an example, a millimeter wave radar is employed as the vicinity information detection sensor 58, but this is not limiting and alternative sensors may be employed.

An opening portion 12A is formed in a region of the roof panel 12 in which the vicinity information detection sensor 58 is disposed. The opening portion 12A is closed off (covered) by a transmissive member 59 that serves as a cover.

The transmissive member 59 is disposed at the vehicle upper side of the vicinity information detection sensor 58 and is formed in a substantially circular shape in plan view. A bulge portion 59A, which bulges to the vehicle upper direction, is formed at a central portion of the transmissive member 59. The vicinity information detection sensor 58 that protrudes to the vehicle upper side relative to the roof panel 12 is covered from the vehicle upper side thereof by this bulge portion 59A.

The transmissive member 59 is formed of a material that allows transmission of a detection carrier that the detection portions 58A use for detection. The transmissive member 59 according to the present exemplary embodiment is formed of a non-transparent resin material. In the present exemplary embodiment, the transmissive member 59 is the same color as the roof panel 12. The bulge portion 59A of the transmissive member 59 is formed so as to oppose the detection portions 58A in the vehicle front-and-rear direction and the vehicle width direction.

—Operation and Effects—

Now, operation and effects of the vehicle 50 in which the arrangement structure for the vicinity information detection sensor 58 according to the present exemplary embodiment is employed are described. In the present exemplary embodiment, a portion of the vicinity information detection sensor 58 is disposed inside the roof reinforcement 51. Thus, a protrusion amount of the vicinity information detection sensor 58 to the vehicle outer side may be reduced.

In addition, because the protrusion amount of the vicinity information detection sensor 58 is made small, a protrusion amount of the bulge portion 59A of the transmissive member 59 that covers the vicinity information detection sensor 58 may be made small. Thus, air resistance during running may be reduced. Hence, aerodynamic characteristics may be improved compared to a structure in which the vicinity information detection sensor 58 is disposed on a roof panel, a structure in which the vicinity information detection sensor 58 is mounted at the vehicle outer side of a vehicle framework member, or the like. Further, because the protrusion amount of the bulge portion 59A is made small, the appearance of the vehicle 50 may be improved compared to a vehicle in which the vicinity information detection sensor 58 protrudes greatly from the roof panel 12.

Fourth Exemplary Embodiment

Now, an autonomous driving vehicle in which an arrangement structure for a vicinity information detection sensor in accordance with a fourth exemplary embodiment is employed is described with reference to FIG. 7 and FIG. 8. Structures that are the same as in the first exemplary embodiment are assigned the same reference numerals and are not described here.

Figure 7:
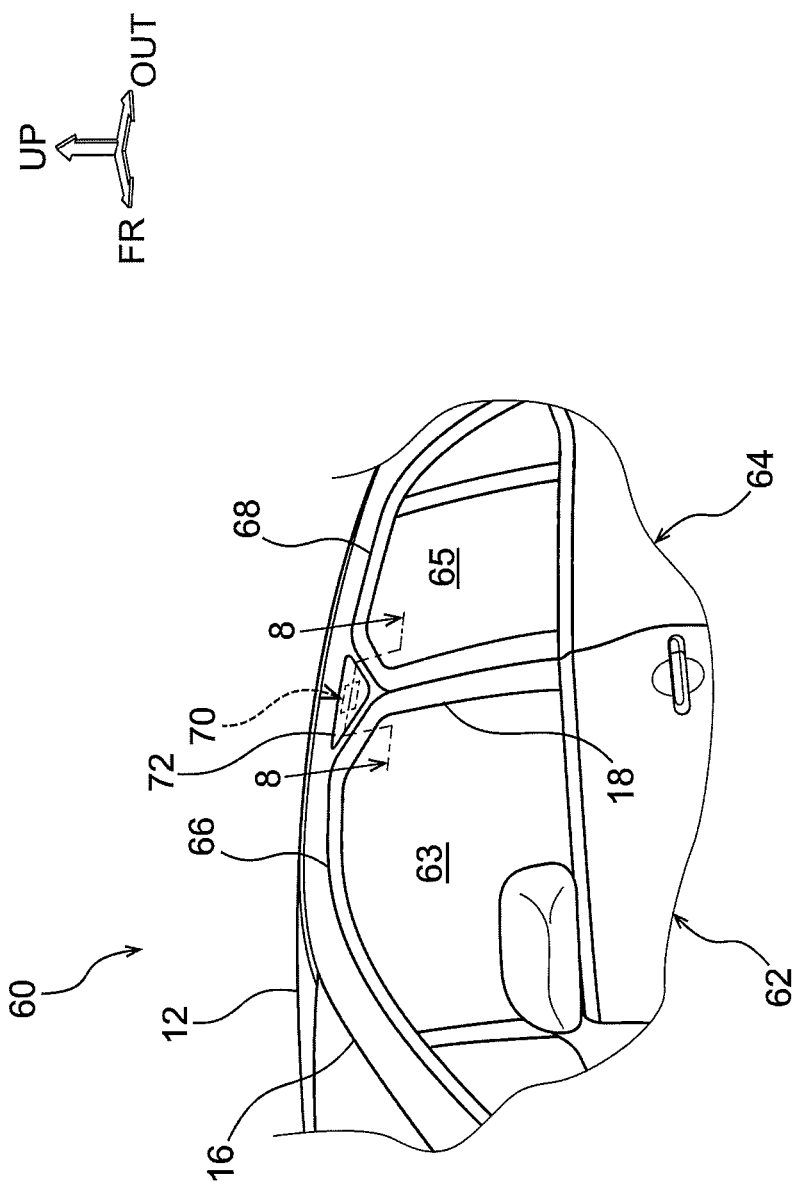
FIG. 7 is a perspective view showing a vehicle upper portion of a vehicle in which an arrangement structure for a vicinity information detection sensor in accordance with a fourth exemplary embodiment is employed.

As shown in FIG. 7, an autonomous driving vehicle 60 (hereinafter referred to simply as "the vehicle 60") according to the present exemplary embodiment is provided, at a vehicle side portion, with a front side door 62 and a rear side door 64. A vicinity information detection sensor 70 according to the present exemplary embodiment is disposed at an upper portion of the center pillar 18 (a joining portion of the center pillar 18 to the roof side rail 14). The center pillar 18 serves as a vehicle framework member that is disposed between the front side door 62 and the rear side door 64.

In more detail, a front door frame 66 that supports an outer periphery portion of a front side glass 63 is provided at an upper portion of the front side door 62, and a rear door frame 68 that supports an outer periphery portion of a rear side glass 65 is provided at an upper portion of the rear side door 64. A transmissive member 72 that serves as a cover is provided between the front door frame 66 and the rear door frame 68. The vicinity information detection sensor 70 is disposed at the vehicle inner side of the transmissive member 72.

Figure 8:
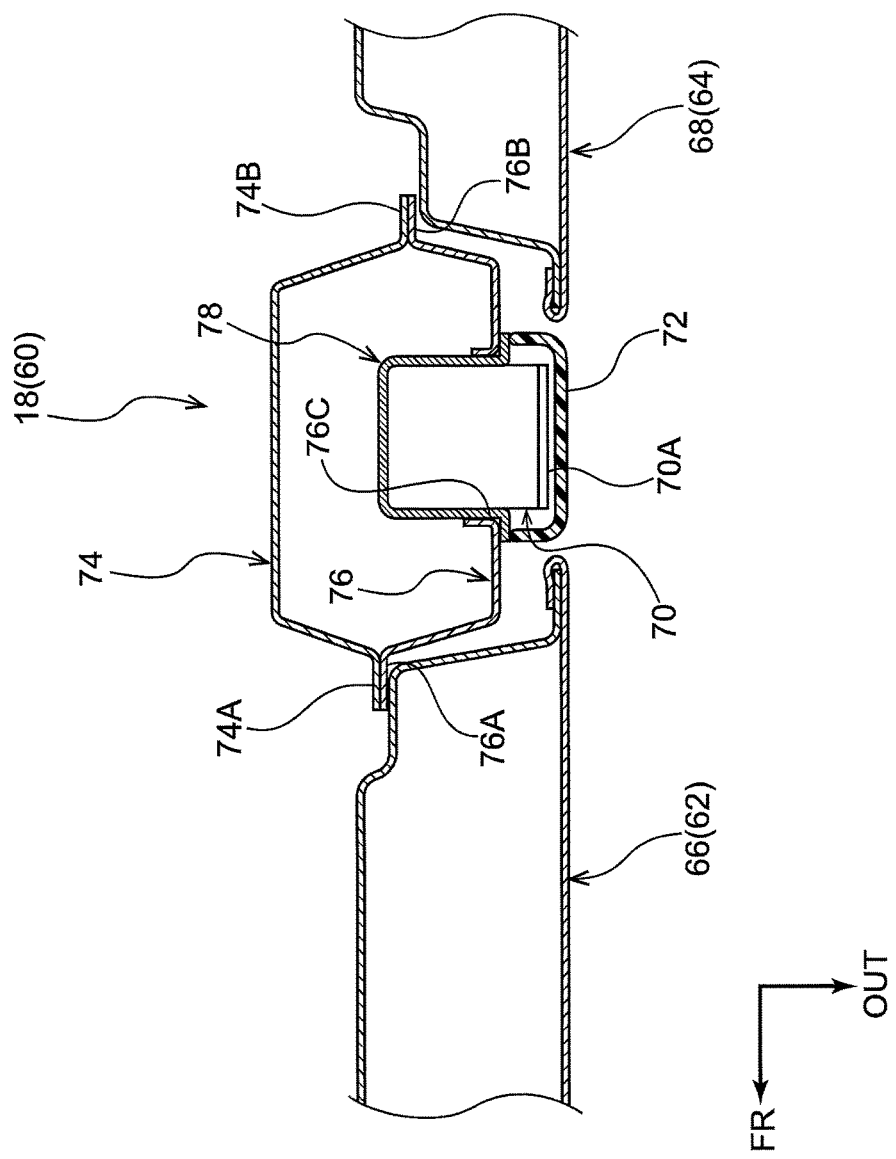
FIG. 8 is a sectional diagram showing a section cut along line 8-8 of FIG. 7 in a magnified state.

As shown in FIG. 8, the center pillar 18 is formed as a closed cross section structure (it defines an enclosed chamber) that includes a center pillar inner panel 74 and a center pillar outer panel 76. The center pillar 18 is formed of members that feature electrical conductivity. The center pillar inner panel 74 is disposed at the vehicle inner side. A cross section of the center pillar inner panel 74 cut horizontally along the vehicle width direction is formed substantially in a hat shape that is open to the vehicle width direction outer side. An inner side front flange 74A protrudes to the vehicle forward side from a front end portion of the center pillar inner panel 74. An inner side rear flange 74B protrudes to the vehicle rearward side from a rear end portion of the center pillar inner panel 74.

The center pillar outer panel 76 is disposed at the vehicle width direction outer side relative to the center pillar inner panel 74. A cross section of the center pillar outer panel 76 cut horizontally along the vehicle width direction is formed substantially in a hat shape that is open to the vehicle width direction inner side. An outer side front flange 76A protrudes along the inner side front flange 74A from a front end portion of the center pillar outer panel 76. The outer side front flange 76A and the inner side front flange 74A are joined together by welding or the like.

An outer side rear flange 76B protrudes along the inner side rear flange 74B from a rear end portion of the center pillar outer panel 76. The outer side rear flange 76B and the inner side rear flange 74B are joined together by welding or the like.

An insertion hole 76C is formed in the center pillar outer panel 76. A bracket 78 is joined to a hole edge of the insertion hole 76C. The vicinity information detection sensor 70 is mounted to the center pillar outer panel 76 via the bracket 78.

The bracket 78 is formed in a substantial hat shape in cross section that is open to the vehicle width direction outer side. The bracket 78 is inserted inside the center pillar 18. A flange protrudes to the outer periphery side from an opening portion of the bracket 78. This flange is joined to a hole edge of the insertion hole 76C.

The vicinity information detection sensor 70 is disposed at the bracket 78 that is structured as described above. A portion of the vicinity information detection sensor 70 is tightly fitted into the bracket 78.

A detection portion 70A is provided at the vehicle width direction outer side of the vicinity information detection sensor 70. The detection portion 70A is oriented to the vehicle outer side and is configured such that vicinity information of the vehicle 60 may be detected by the detection portion 70A. In the present exemplary embodiment, as an example, a millimeter wave radar is employed as the vicinity information detection sensor 70, but this is not limiting and alternative sensors may be employed.

The transmissive member 72 is disposed at the vehicle width direction outer side relative to the vicinity information detection sensor 70. A cross section of the transmissive member 72 cut horizontally along the vehicle width direction is formed substantially in a "U" shape that is open to the vehicle width direction inner side. The transmissive member 72 is mounted to the bracket 78 or the center pillar outer panel 76 so as to cover the vicinity information detection sensor 70.

The transmissive member 72 is formed of a material that allows transmission of a detection carrier that the detection portion 70A uses for detection. The transmissive member 72 according to the present exemplary embodiment is formed of a non-transparent resin material. In the present exemplary embodiment, the transmissive member 72 is the same color as the center pillar 18. The transmissive member 72 is disposed so as to overlap with the front door frame 66 and the rear door frame 68 when viewed in the vehicle width direction.

—Operation and Effects—

Now, operation and effects of the vehicle 60 in which the arrangement structure for the vicinity information detection sensor 70 according to the present exemplary embodiment is employed are described. In the present exemplary embodiment, a portion of the vicinity information detection sensor 70 is disposed inside the center pillar 18. Thus, a protrusion amount of the vicinity information detection sensor 70 to the vehicle outer side may be made small, and aerodynamic characteristics of the vehicle 60 may be improved compared to a structure in which the vicinity information detection sensor 70 is disposed on a roof panel, a structure in which the vicinity information detection sensor 70 is mounted at the vehicle outer side of a vehicle framework member, or the like.

In the present exemplary embodiment, because the protrusion amount of the vicinity information detection sensor 70 to the vehicle outer side is made small, there is no interference when the front side door 62 or the rear side door 64 is opening or closing. Therefore, the vicinity information detection sensor 70 may be disposed at the center pillar 18 and information on the vicinity of the vehicle side portion may be effectively detected. Other operations are the same as in the first exemplary embodiment.

Fifth Exemplary Embodiment

Now, an autonomous driving vehicle in which an arrangement structure for a vicinity information detection sensor in accordance with a fifth exemplary embodiment is employed is described with reference to FIG. 9 and FIG. 10. Structures that are the same as in the first exemplary embodiment are assigned the same reference numerals and are not described here.

Figure 9:
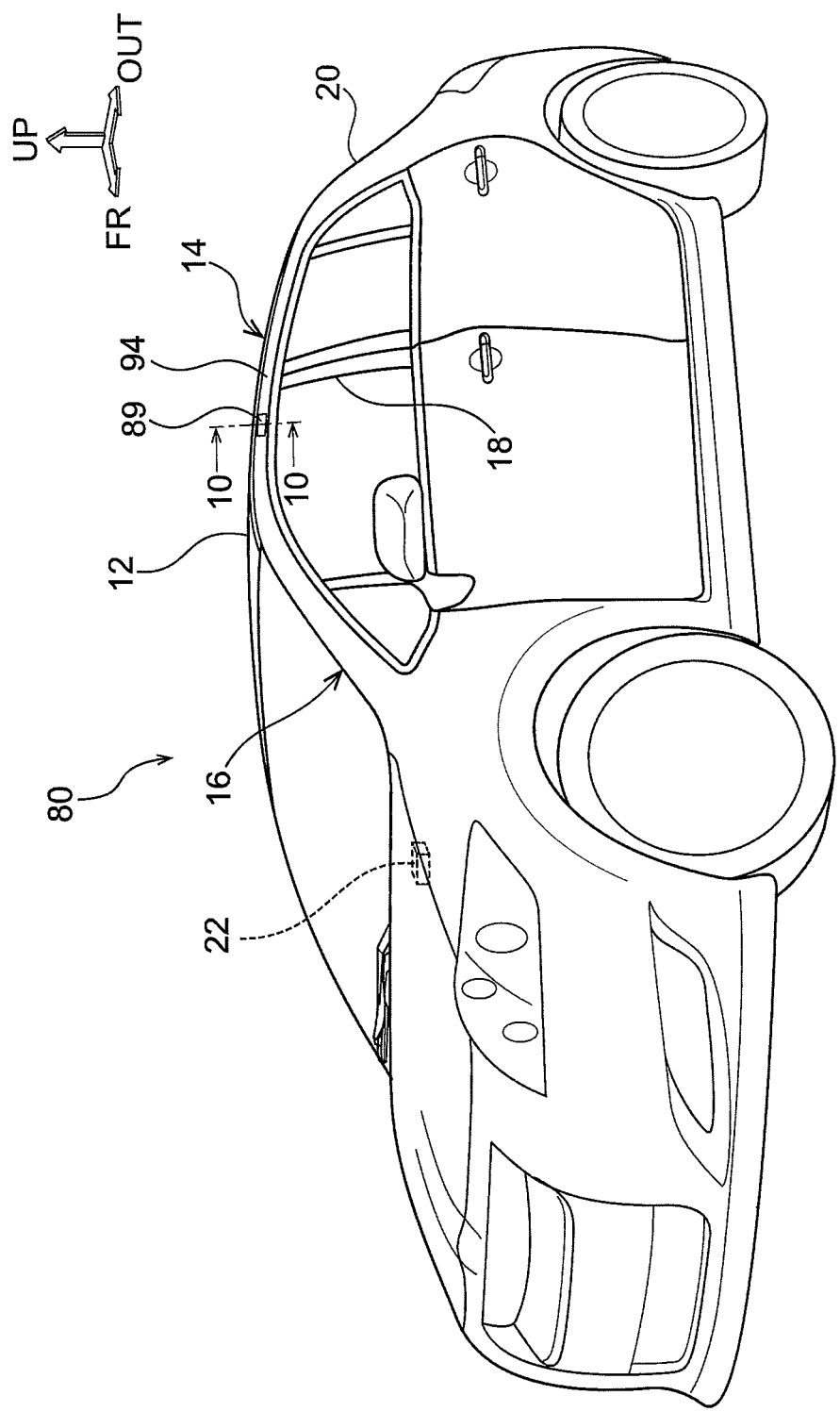
FIG. 9 is a perspective view showing a vehicle in which an arrangement structure for a vicinity information detection sensor in accordance with a fifth exemplary embodiment is employed.
Figure 10:
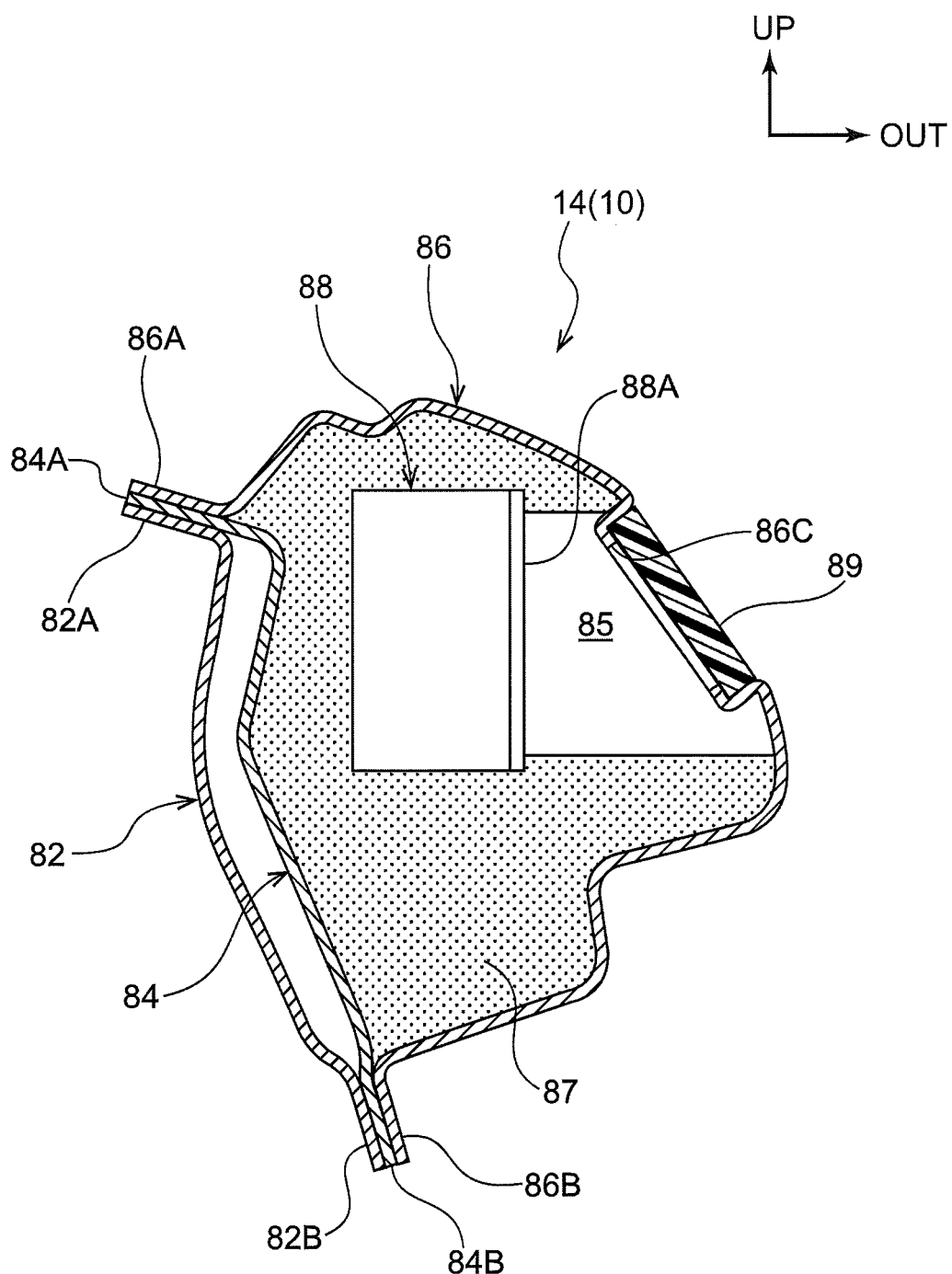
FIG. 10 is a sectional diagram showing a section cut along line 10-10 of FIG. 9 in a magnified state.

As shown in FIG. 9, in an autonomous driving vehicle 80 (hereinafter referred to simply as "the vehicle 80") according to the present exemplary embodiment, a transmissive member 89 that serves as a cover is disposed at the roof side rail 14 that serves as a vehicle framework member disposed at the vehicle upper portion. As shown in FIG. 10, a vicinity information detection sensor 88 is disposed at the vehicle inner side of the transmissive member 89.

The roof side rail 14 is formed as a closed cross section structure (it defines an enclosed chamber) that includes a roof side rail inner panel 82, a roof side rail outer panel 86 and an outer reinforcement 84.

The roof side rail inner panel 82 is disposed at the vehicle inner side and extends in the vehicle up-and-down direction. An inner side upper flange 82A protrudes to the vehicle width direction inner side from an upper end portion of the roof side rail inner panel 82. An inner side lower flange 82B protrudes to the vehicle lower side from a lower end portion of the roof side rail inner panel 82.

The roof side rail outer panel 86 is disposed at the vehicle width direction outer side relative to the roof side rail inner panel 82. A cross section of the roof side rail outer panel 86 cut vertically along the vehicle width direction is formed substantially in a hat shape that is open to the vehicle width direction inner side. An outer side upper flange 86A protrudes along the inner side upper flange 82A from an upper end portion of the roof side rail outer panel 86. An outer side lower flange 86B protrudes along the inner side lower flange 82B from a lower end portion of the roof side rail outer panel 86.

The outer reinforcement 84 is disposed between the roof side rail inner panel 82 and the roof side rail outer panel 86. The outer reinforcement 84 extends along the roof side rail inner panel 82 in the vehicle up-and-down direction.

An upper flange 84A protrudes to the vehicle width direction inner side from an upper end portion of the outer reinforcement 84. The upper flange 84A is joined to both the inner side upper flange 82A and the outer side upper flange 86A by welding or the like. A lower flange 84B protrudes to the vehicle width direction inner side from a lower end portion of the outer reinforcement 84. The lower flange 84B is joined to both the inner side lower flange 82B and the outer side lower flange 86B by welding or the like. Thus, the roof side rail 14 is structured with a closed cross section between the roof side rail inner panel 82 and the outer reinforcement 84 and is structured with a closed cross section between the outer reinforcement 84 and the roof side rail outer panel 86.

The vicinity information detection sensor 88 is disposed between the outer reinforcement 84 and the roof side rail outer panel 86. In the present exemplary embodiment, the whole of the vicinity information detection sensor 88 is disposed inside the roof side rail 14. A foam material 87 that serves as a shock-absorbing member is provided between the vicinity information detection sensor 88 and the outer reinforcement 84 and roof side rail outer panel 86. Hence, the vicinity information detection sensor 88 is supported by the foam material 87.

A detection portion 88A is provided at the vehicle width direction outer side of the vicinity information detection sensor 88. The detection portion 88A is oriented to the vehicle outer side and is configured such that vicinity information of the vehicle 80 may be detected by the detection portion 88A. In the present exemplary embodiment, as an example, a millimeter wave radar is employed as the vicinity information detection sensor 88, but this is not limiting and alternative sensors may be employed.

An opening portion 86C is formed in the roof side rail outer panel 86. The transmissive member 89 is mounted at the opening portion 86C and the opening portion 86C is closed off (covered) by the transmissive member 89. The transmissive member 89 is disposed to oppose the detection portion 88A and is formed of a material that allows transmission of a detection carrier that the detection portion 88A uses for detection. The transmissive member 89 according to the present exemplary embodiment is formed of a non-transparent resin material. A region between the detection portion 88A and the transmissive member 89 is a cavity portion 85 that is not filled with the foam material 87. Thus, a structure is formed such that the detection carrier transmitted through the transmissive member 89 is detected at the detection portion 88A without being impeded by the foam material 87.

—Operation and Effects—

Now, operation and effects of the vehicle 80 in which the arrangement structure for the vicinity information detection sensor 88 according to the present exemplary embodiment is employed are described. In the present exemplary embodiment, the whole of the vicinity information detection sensor 88 is disposed inside the roof side rail 14. Therefore, the vehicle 80 may be formed with the same external shape as a vehicle that is not equipped with the vicinity information detection sensor 88. That is, there is no bulging of the roof side rail 14 to the vehicle outer side due to the vicinity information detection sensor 88. Thus, aerodynamic characteristics the same as for a vehicle that is not equipped with the vicinity information detection sensor 88 may be obtained.

In the present exemplary embodiment, because the opening portion 86C of the roof side rail outer panel 86 is closed off by the transmissive member 89, ingression of rainwater or foreign matter into the cross section or the like and a consequent degradation of the detection accuracy of the vicinity information detection sensor 88 may be avoided.

In the present exemplary embodiment, because the foam material 87 is provided around the vicinity information detection sensor 88, when a load acts on the roof side rail 14 from the exterior, a portion of this load is absorbed by the foam material 87 and the vicinity information detection sensor 88 may be protected. That is, shock resistance performance of the vicinity information detection sensor 88 may be improved.

In the present exemplary embodiment, because the vicinity information detection sensor 88 is disposed at the roof side rail 14, vicinity information may be detected over a wide range from the vehicle upper portion. Other operations are the same as in the first exemplary embodiment.

In the present exemplary embodiment, as shown in FIG. 9, the vicinity information detection sensor 88 is disposed at the roof side rail 14 located between the front pillar 16 and the center pillar 18, but the embodiments are not limited thus. For example, the vicinity information detection sensor 88 may be disposed at a joining portion 94 of the center pillar 18 and the roof side rail 14. Because the joining portion 94 between the roof side rail 14 and the center pillar 18 has a higher stiffness than general portions of the roof side rail 14, mounting stiffness of the vicinity information detection sensor 88 may be assured by the vicinity information detection sensor 88 being disposed at the joining portion 94. As a result, vibrations acting on the vicinity information detection sensor 88 during running may be reduced, and detection accuracy may be improved.

In the present exemplary embodiment, the foam material 87 is employed as the shock-absorbing member but the embodiments are not limited to this. For example, a resilient body of rubber or the like, or a gel or the like may be employed.

In the present exemplary embodiment, the foam material 87 is provided between the vicinity information detection sensor 88 and the outer reinforcement 84 and roof side rail outer panel 86, but the embodiments are not limited to this. For example, as in the variant example illustrated in FIG. 11, the vicinity information detection sensor 88 may be mounted using an installation bracket 92.

Figure 11:
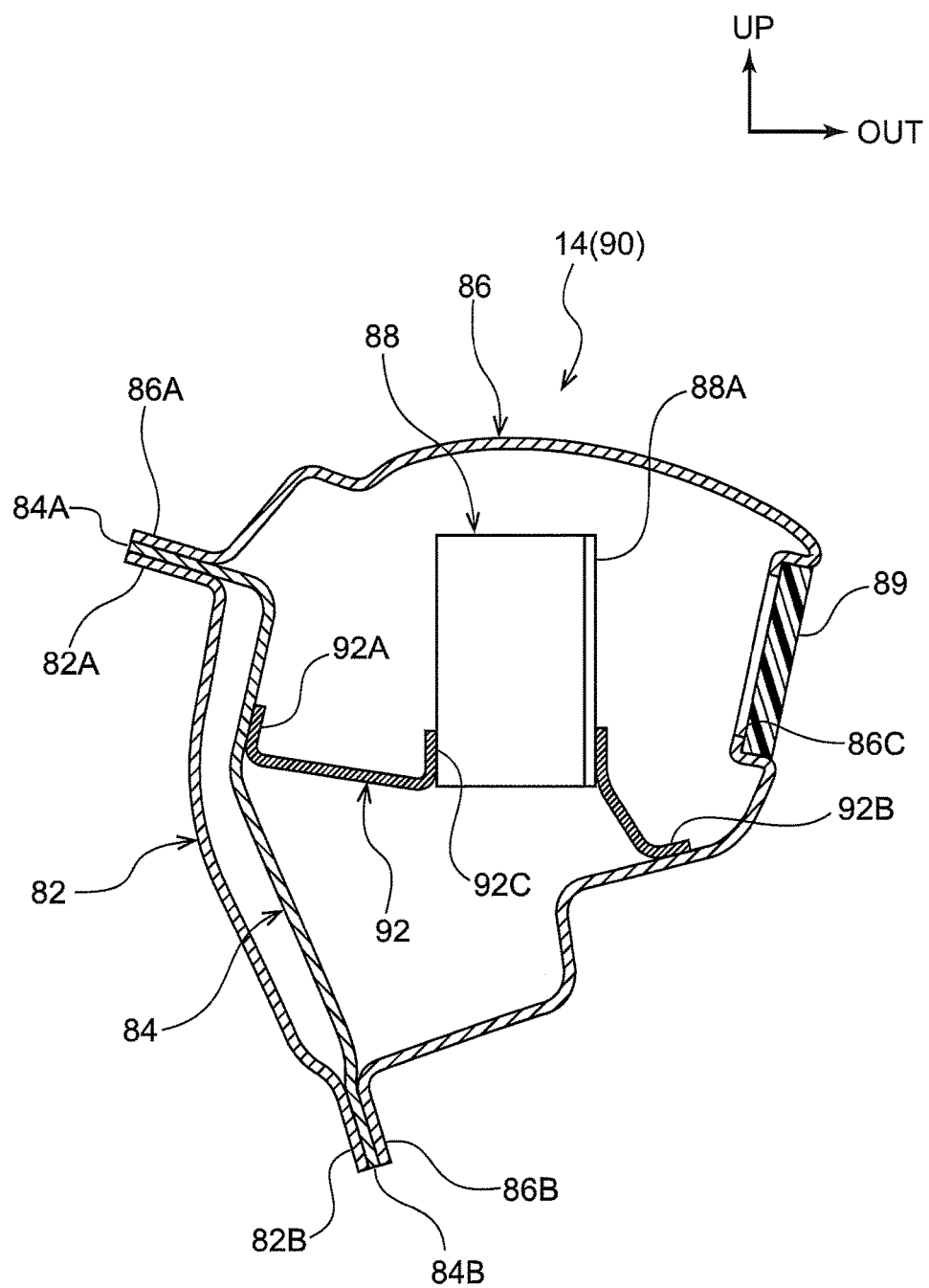
FIG. 11 is a sectional diagram, corresponding to FIG. 10, showing a variant example of the vehicle in which the arrangement structure for a vicinity information detection sensor in accordance with the fifth exemplary embodiment is employed.

As shown in FIG. 11, in an autonomous driving vehicle 90 (hereinafter referred to simply as "the vehicle 90") in which an arrangement structure for a vicinity information detection sensor in accordance with the variant example is employed, the vicinity information detection sensor 88 is disposed between the outer reinforcement 84 and the roof side rail outer panel 86.

The installation bracket 92 spans across the interior of the roof side rail 14 (between the outer reinforcement 84 and the roof side rail outer panel 86). The vicinity information detection sensor 88 is mounted to the roof side rail 14 via the installation bracket 92.

The installation bracket 92 extends in the vehicle width direction. An inner flange 92A protrudes along the outer reinforcement 84 from a vehicle width direction inner side end portion of the installation bracket 92. The inner flange 92A is joined to the outer reinforcement 84. An outer flange 92B protrudes along the roof side rail outer panel 86 from a vehicle width direction outer side end portion of the installation bracket 92. The outer flange 92B is joined to the roof side rail outer panel 86.

A mounting hole 92C is formed in a vehicle width direction central region of the installation bracket 92. A lower end portion of the vicinity information detection sensor 88 is inserted into the mounting hole 92C and mounted. A hole edge of the mounting hole 92C extends to the vehicle upper side along the vicinity information detection sensor 88 and supports an outer periphery face of the vicinity information detection sensor 88.

In the present variant example as described above, because the installation bracket 92 is installed in the roof side rail 14, the efficiency of transmission of loads that act on the roof side rail 14 may be improved. As a result, stiffness of the roof side rail 14 may be raised.

In the present variant example, the shape of the roof side rail outer panel 86 is altered and the opening face of the opening portion 86C is formed to face diagonally downward. Because the transmissive member 89 is mounted at this opening portion 86C, the transmissive member 89 is disposed so as to be inclined toward the vehicle width direction inner side in the direction from the vehicle upper side to the vehicle lower side.

Because the outer face of the transmissive member 89 faces diagonally downward in the present variant example, dirt is less likely to adhere to the transmissive member 89 even when there is rain. Thus, the detection accuracy of the vicinity information detection sensor 88 may be excellently maintained.

The first to fifth exemplary embodiments have been described hereabove but the embodiments are not limited by the above-described structures and it will be clear that numerous modes beside the above structures may be adopted. For example, in the above exemplary embodiments, structures are described in which a vicinity information detection sensor is disposed at the vehicle left side, but the embodiments are not limited to this. A vicinity information detection sensor may be disposed at the vehicle right side, and a pair of vicinity information detection sensors may be disposed at the vehicle right side and the vehicle left side. Furthermore, the structures of the above exemplary embodiments may be combined. For example, a structure may be formed in which respective vicinity information detection sensors are disposed at a front pillar, a rear pillar and a roof side rail.

In the above exemplary embodiments, each transmissive member is formed of a non-transparent resin material but the embodiments are not limited to this. A transmissive member may be formed of an alternative material provided that the member allows transmission of the detection carrier that is detected by the detection portion of the vicinity information detection sensor. For example, if a laser radar, an optical camera or the like is employed as the vicinity information detection sensor, the transmissive member may be formed of a transparent resin material that transmits laser light, visible light or the like, and if an ultrasound sensor is employed as the vicinity information detection sensor, the transmissive member may be formed of a material that transmits ultrasound waves.

Provided that at least a portion of a vicinity information detection sensor is disposed inside a closed cross section structure of a vehicle framework member, the location at which the vicinity information detection sensor is disposed may be, apart from the locations described in the above exemplary embodiments, a rocker, a belt line reinforcement or the like.

In the first to fourth exemplary embodiments, a shock-absorbing member such as a foam material or the like is not provided inside the vehicle framework member, but this is not limiting and structures are possible in which a shock-absorbing member is provided. For example, a shock-absorbing member that is a foam material or the like may be provided inside the front pillar 16 of FIG. 2 (i.e., between the front pillar inner panel 24 and the front pillar outer panel 26). Thus, the stiffness of the front pillar 16 may be raised and the vicinity information detection sensor 34 may be protected by the foam material.

The shapes and sizes of the vicinity information detection sensors and the positions and shapes of the detection portions according to the above exemplary embodiments are not particularly limiting but may be suitably modified in accordance with types, positions of arrangement and the like of vicinity information detection sensors.

What is claimed is:

1. A sensor arrangement structure comprising:
 a vehicle framework member having a closed cross-section structure throughout substantially a whole length of the vehicle framework member, the closed cross-section structure defining a hollow chamber that is bounded on all sides by walls of the vehicle framework member except for a hole in the vehicle framework member;
 a vicinity information detection sensor attached to the vehicle framework member, the vicinity information detection sensor forming a portion of a boundary of the closed cross-section structure of the vehicle framework member by blocking the hole, at least a portion of the vicinity information detection sensor being disposed inside the closed cross-section structure of the vehicle framework member, and a detection portion of the vicinity information detection sensor that detects vicinity information of a vehicle being oriented toward a vehicle outer side of the vehicle framework member; and
 a cover that is disposed to cover and oppose the detection portion and that allows transmission of a detection medium that is detected by the detection portion, wherein
 the vehicle framework member is part of the vehicle's frame, and
 the vicinity information detection sensor is disposed at a joining portion between a roof side rail and a center pillar of the vehicle.

2. The sensor arrangement structure according to claim 1, wherein
 the hole in the vehicle framework member is an insertion hole into which the vicinity information detection sensor extends,
 the vicinity information detection sensor is mounted to a mounting bracket that is joined to a hole edge of the insertion hole, and
 the vicinity information detection sensor and the mounting bracket cover the insertion hole.

3. The sensor arrangement structure according to claim 1, further comprising a shock-absorbing member provided between the vicinity information detection sensor and a wall of the vehicle framework member.

4. The sensor arrangement structure according to claim 1, wherein the vehicle framework member is formed of a material having electrical conductivity.

5. The sensor arrangement structure according to claim 1, wherein the cover is transmissive of radio waves.

6. The sensor arrangement structure according to claim 1, wherein the cover is transmissive of ultrasonic waves.

7. The sensor arrangement structure according to claim 1, wherein the cover is transmissive of visible light.

8. The sensor arrangement structure according to claim 1, wherein the cover is transmissive of laser light.

* * * * *